(12) United States Patent
Mah et al.

(10) Patent No.: US 9,930,222 B2
(45) Date of Patent: Mar. 27, 2018

(54) METHOD AND SYSTEM FOR SMOOTH VIDEO TRANSITION BETWEEN VIDEO SOURCES

(71) Applicant: Intersil Americas LLC, Milpitas, CA (US)

(72) Inventors: Jeremy Mah, San Jose, CA (US); Morgan Tang, Milpitas, CA (US); Hyoungyon Han, San Jose, CA (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 0 days.

(21) Appl. No.: 15/429,033

(22) Filed: Feb. 9, 2017

(65) Prior Publication Data

US 2017/0264793 A1    Sep. 14, 2017

Related U.S. Application Data

(60) Provisional application No. 62/352,420, filed on Jun. 20, 2016, provisional application No. 62/305,786, filed on Mar. 9, 2016.

(51) Int. Cl.
*H04N 5/06* (2006.01)
*H04N 5/44* (2011.01)

(52) U.S. Cl.
CPC .............. *H04N 5/06* (2013.01); *H04N 5/44* (2013.01)

(58) Field of Classification Search
CPC ...................................................... H04N 5/06
USPC ....... 348/521, 522, 526, 558, 584, 553, 441, 348/445, 449, 537, 538
See application file for complete search history.

(56) References Cited

U.S. PATENT DOCUMENTS

| 5,790,096 | A  | * | 8/1998  | Hill, Jr. ................. | G09G 5/005 345/600 |
| 5,917,552 | A  | * | 6/1999  | Van Court ........... | G09G 3/2096 348/555 |
| 6,177,922 | B1 | * | 1/2001  | Schiefer ................. | G09G 5/005 345/213 |
| 6,671,284 | B1 | * | 12/2003 | Yonge, III ................ | H04L 1/16 370/462 |
| 7,224,736 | B2 | * | 5/2007  | Ota .......................... | H03L 7/16 348/537 |
| 8,330,874 | B2 | * | 12/2012 | Yamamoto ............... | H04N 7/01 348/441 |

(Continued)

*Primary Examiner* — Paulos M Natnael
(74) *Attorney, Agent, or Firm* — Foley & Lardner LLP; Mark J. Danielson

(57) ABSTRACT

A method includes determining whether to switch from a first input video signal to a second input video signal. Upon switching from a first input video signal to a second input video signal, determining whether the current displayed frame has terminated. If the current displayed frame has terminated, process the second video input signal and load data corresponding to the second video input signal from the timing generator, scale and pixel clock registers correspondingly into the timing generator, scaler and pixel clock. Generate a clock signal for the second input video signal. Calculate generator parameter(s) corresponding to the second input video signal. Generate timing control signals for the second input video signal. Determine if a new frame of the second input video signal has occurred. Provide timing control signals and pixel data for the video to be displayed and corresponding the second input video signal.

20 Claims, 4 Drawing Sheets

(56) References Cited

U.S. PATENT DOCUMENTS

| | | | |
|---|---|---|---|
| 2002/0080280 A1* | 6/2002 | Champion | G09G 5/00 |
| | | | 348/584 |
| 2004/0088638 A1* | 5/2004 | Cheung | G06F 11/273 |
| | | | 714/774 |
| 2005/0030425 A1* | 2/2005 | Nagakura | G09G 5/363 |
| | | | 348/553 |
| 2010/0134633 A1* | 6/2010 | Engeli | H04N 7/0122 |
| | | | 348/180 |
| 2012/0281971 A1* | 11/2012 | Lin | G11B 27/005 |
| | | | 386/284 |

* cited by examiner

METHOD AND SYSTEM FOR SMOOTH VIDEO TRANSITION BETWEEN VIDEO SOURCES

CROSS-REFERENCE TO RELATED APPLICATIONS

The present application claims priority to U.S. Prov. Appln. No. 62/305,786 filed Mar. 9, 2016, and to U.S. Prov. Appln. No. 62/352,420 filed Jun. 20, 2016, the contents of all such applications being incorporated herein by reference in their entirety.

TECHNICAL FIELD

The present embodiment relates to processing video, and more particularly to a method and system for smooth video transition between video sources.

BACKGROUND

Deficiencies of prior art techniques for transitioning between video sources still exist. This invention aims at solving such deficiencies and/or providing improvements over the prior art.

SUMMARY

A method includes determining whether to switch from a first input video signal to a second input video signal. Upon switching from a first input video signal to a second input video signal, determining whether the current displayed frame has terminated. If the current displayed frame has terminated, process the second video input signal and load data corresponding to the second video input signal from the timing generator, scale and pixel clock registers correspondingly into the timing generator, scaler and pixel clock. Generate a clock signal for the second input video signal. Calculate generator parameter(s) corresponding to the second input video signal. Generate timing control signals for the second input video signal. Determine if a new frame of the second input video signal has occurred. Provide timing control signals and pixel data for the video to be displayed and corresponding the second input video signal.

It should be noted that some details of the Figures have been simplified and are drawn to facilitate understanding of the inventive embodiments rather than to maintain strict structural accuracy, detail, and scale. It should also be noted that not all circuit elements and operating steps are illustrated, as the general methods of circuit design and operation are well known. It should also be noted that not all details about voltage converters are illustrated, as general designs of voltage converters are well known.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Embodiments relate generally to video processing circuits.

Figure 1:
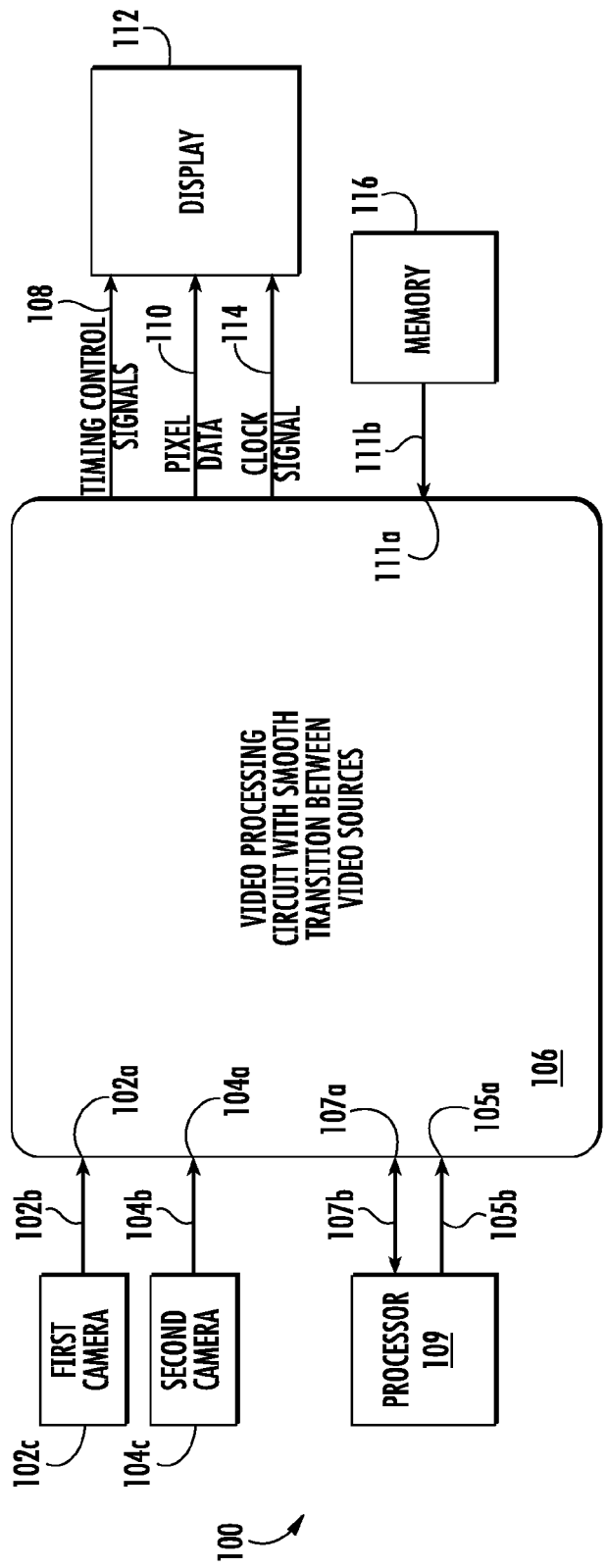
FIG. 1 illustrates an embodiment of a video system.

FIG. 1 illustrates an exemplary embodiment of a video system 100 comprising a first camera 102c, a second camera 104c, a video processing circuit with smooth transition between video sources 106 (including a first video input 102a, a second video input 104a, and a video selector input 105a), a display 112, a processor 109, and a memory 116. Other video sources may be used in lieu of cameras. The memory 116 conveys memory data 111b to the video processor with smooth transition between video sources 106 through the memory data input 111a. In one embodiment, the memory 116 is non-volatile memory, e.g. flash memory or electrically erasable programmable read only memory. The video system 100 may have more than two video inputs. The video system 100 may be used in automotive, security, and other applications.

The first video input 102a and the second video input 104a are configured to receive respectively a first input video signal 102b and a second input video signal 104b. The first and second input video signals 102b, 104b include frames of images to be presented on the display 112. In one embodiment, a single frame is displayed on the display 112.

The video selector input 105a is configured to receive a video selector control signal 105b which is used to determine which input video signal is to be presented on the display 112. In one embodiment, the video selector control signal 105b is externally provided by a processor 109. The processor 109 may be a microcontroller, a microprocessor, or state machine. In another embodiment, the processor 109 can be embedded in the video processing circuit with smooth transition between video sources 106 rather than being external to it.

In yet another embodiment, the processor 109 can be used to calculate parameters, e.g. for the subsequently described timing generator, scaler, and pixel clock, for the video processing circuit with smooth transition between video sources 106. In a further embodiment, the processor 109 is used to calculate data for the A and B timing, scaler and pixel clock registers 214, 218, 220. In such event, the video processing circuit with smooth transition between video sources 106 has a data input/output ('I/O') 107a configured to receive and transmit I/O data 107b respectively from and to the processor 109.

In a further embodiment, the processor 109 is externally controlled to generate the appropriate video selector control signal 105b. In another embodiment, whether or not a processor 109 is used to calculate parameters, a separate device, e.g. a switch, may be used in lieu of the processor 109 to generate and provide the video selector control signal 105b.

In one embodiment, the display 112 may be a liquid crystal display ('LCD'), an organic light emitting diode ('OLED') display, or any other type of non-raster scan video display.

In another embodiment, the video processing circuit with smooth transition between video sources 106 is configured to generate timing control signals 108, including an end of frame timing control signal, pixel data 110, and a clock signal 114. The display 112 is configured to receive the timing control signals 108, pixel data 110, and clock signal 114 which permit the display 112 to present an image. In one embodiment, the end of frame timing control signal may be a display enable signal which indicates the end of frame when the display enable signal is blanked. The display enable signal may also be referred to as the vertical active signal. In another embodiment, the video system 100 is capable of converting more than one video format so that more than one video formats can be presented on the display 112.

Each of the first and second input video signals 102b, 104b include, as will be later described, timing control signals (e.g. horizontal and video sync signals), a clock signal (i.e. the per pixel data rate signal), and pixel data. The first and second input video signals 102b, 104b may have different video formats. Different video formats have different timing control signals, clock signals, and/or differing amounts of pixels per frame. A display 112 may be have a number of pixels in the horizontal and/or vertical directions that differs from the selected input video signal. The video processing circuit with smooth transition between video sources 106 scales, as necessary, the pixel data to properly fit on the display 112. Correspondingly, the timing control signals 108 and clock signal 114 may need to be modified so that the pixel data 110 is properly presented on the display 112, e.g. without distortion. The video processing circuit with smooth transition between video sources 106 converts the timing control signals, clock signal, and pixel data of a selected video input so that the resulting video can be properly presented on the display 112.

Figure 2:
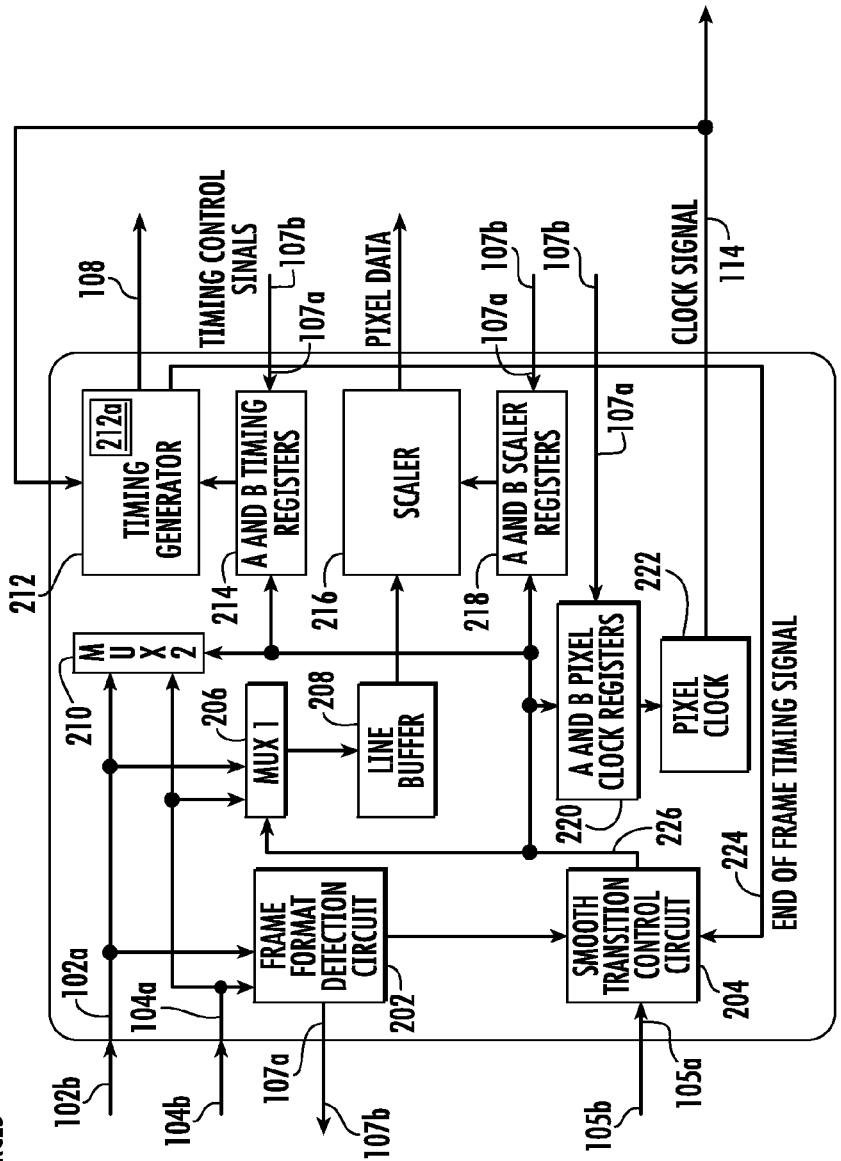
FIG. 2 illustrates an embodiment of a video processing circuit with smooth transition between video sources.

When display 112 switches from displaying a first input video signal 102b to a second input video signal 104b, undesired artifacts can be presented on the display 112 because partial frame(s) of one or both video signals may be displayed. The video processing circuit with smooth transition between video sources 106 is advantageously formed with a smooth transition control circuit to facilitate the smooth transition (avoiding such artifacts) between the frames of an initially displayed video signal and a frame of another video signal that is subsequently displayed. One embodiment of the video processing circuit with smooth transition between video sources 106 is illustrated in FIG. 2.

The illustrated video processing circuit with smooth transition between video sources 106 includes a frame format detection circuit 202, a smooth transition control circuit 204, a first multiplexor ('MUX 1') 206, a line buffer 208, a second multiplexor ('MUX 2') 210, a timing generator 212, A and B timing registers 214, a scaler 216, A and B scaler registers 218, a pixel clock 222, and A and B pixel clock registers 220. In one embodiment, for each of the registers 214, 218, 220, the A portion, e.g. memory portion A, of a register stores parameter data associated with the first input video signal 102b; the B portion, e.g. memory portion B, of the register stores parameter data associated with second input video signal 104b. Parameter data may be used to generate timing signals, scale the number of pixel's to be displayed, and to modify the pixel clock.

In another embodiment, the first multiplexor 206 and the second multiplexor 210 may be incorporated into a single multiplexor. In yet a further embodiment, the A and B timing, scaler and pixel clock registers 214, 218, 220 may be incorporated into a single memory. In another embodiment, such a memory may be a non-volatile memory, e.g. flash memory or electrically erasable programmable read only memory.

The frame format detection circuit 202 is coupled to the first and second video inputs 102a, 104a, and is configured to receive the first and second input video signals 102b, 104b. The frame format detection circuit 202 detects, e.g. periodically, characteristics of the video formats, including the timing control signals, number of pixels per frame, and clock signal, of frames of the first and second input video signals 102b, 104b. In one embodiment, the frame format detection circuit 202 provides all or some of such information to the processor 109. In turn, the processor 109 calculates the parameter data to be stored in the A and B timing, scaler and pixel clock registers 214, 218, 220. Such parameter data is then conveyed to the A and B timing, scaler and pixel clock registers 214, 218, 220 through the I/O 107a. Alternatively, if the video formats of the input video signals are previously known, such information can be independently calculated and stored in the A and B timing, scaler and pixel clock registers 214, 218, 220 during the manufacturing process, or loaded from the memory 116 during booting up of the video system 100.

In another embodiment, the frame format detection circuit 202 also detects the display enable signal in a frame. When blanked, the display enable signal identifies the end of a frame. In one embodiment, the frame format detection circuit 202 may detect the video formats of all or just some frames of the first and second input video signals 102b, 104b.

The smooth transition control circuit 204 facilitates the smooth transition between frames of the first and second input video signals 102b, 104b. In one embodiment, the smooth transition control circuit 204 accomplishes this by awaiting an end of frame signal for the currently displayed video frame before permitting the video processing circuit with smooth transition between video sources 106 to commence processing (as described further below) newly selected video signal for display. In another embodiment, the video processing circuit with smooth transition between video sources 106 accomplishes this by awaiting the newly selected video signal's vertical synch signal before providing timing control signals and pixel data for the newly selected video signal; such functionality can be implemented by a processor or state machine, external to or within the video processing circuit with smooth transition between video sources 106. The smooth transition control circuit 204 is coupled to the frame format detection circuit 202, first multiplexor 206, the second multiplexor 210, the A and B timing registers 214, the A and B scaler registers 218, and the A and B pixel clock registers 220. The smooth transition control circuit 204 is configured to receive video format information, including timing control signals and number of pixels per frame information, from the frame format detection circuit 202. In one embodiment, the smooth transition control circuit 204 is configured to receive the end of frame timing signal 224, e.g. from the timing generator 212, of the video being displayed. In another embodiment, the smooth transition control circuit 204 is coupled to the video selector input 105*a*, and is configured to receive the video selector control signal 105*b*.

Based upon the video selector control signal 105*b* and the end of frame timing signal 224, the smooth transition control circuit 204 generates control signals 226 which, in one embodiment, (a) command the first and second multiplexors 206, 210 to switch video inputs, and (b) move memory pointers between the A and B portions of the A and B timing, scaler, and pixel clock registers 214, 218, 220. In one embodiment, (a) and (b) occur after the video selector control signal 105 indicates that the input video signal is to change, and then an end of frame timing signal 224 occurs for the presently displayed video frame.

The first and second multiplexors 206, 210 are configured to receive the first and second input video signals 102*b*, 104*b*, and are thus coupled to the first and second video inputs 102*a*, 104*a*. The line buffer 208 is configured to receive the output of the first multiplexor 206; such output will be either the first input video signal 102*b* or the second input video signal 104*b* depending on the setting of the first multiplexor 206, e.g., as controlled by the smooth transition control circuit 204. In one embodiment, the line buffer 208 may store between 2 pixels (if no vertical scaling is required) to about 10 lines of the selected video signal.

The scaler 216 is configured to receive the outputs of the line buffer 208 and the selected portion of the A and B scaler registers 218. Depending upon which input video signal is selected, the corresponding scaler parameter data in the corresponding portion of the A and B scaler register 218 will be loaded into the scaler 216. The scaler 216 scales the frame size, e.g. the number of horizontal and vertical pixels, of the selected video signal so that frames of the selected video signal will be properly presented on the display 112. Thus, the scaler 216 will appropriately scale the pixels provided from the line buffer 208 so the display 112 properly displays an image. In one embodiment, the scaler 216 performs such scaling in real time.

The timing generator 212 is configured to receive the selected input video signal from the second multiplexor 210, and the output from the selected portion of the A and B timing registers 214. The timing generator 212 generates corresponding timing control signals 108 and the end of frame timing signal 224 for the video signal to be displayed. In one embodiment, the A and B timing registers 214 store vertical synch back porch, vertical synch pulse width, and horizontal synch scaling parameters; such parameters are used by the timing generator 212 to calculate the timing control signals 108.

In another embodiment, such timing control signals 108 include horizontal and vertical synch signals needed to properly present a frame of the selected input video signal on the display 112. In another embodiment, the horizontal synch signal may be referred to as a display enable signal. The blanking of the display enable signal indicates the end of a frame of an input video signal. The end of frame timing signal 224 indicates when all pixel data 110 corresponding to a frame of an input video signal has been conveyed to (and is thus presented by) the display 112. The end of frame timing signal 224 may be generated using the display enable signal. The timing generator 212 includes register(s) 212*a* which may be implemented, e.g., with nonvolatile memory as described elsewhere herein. In one embodiment, the timing generator 212 calculates a horizontal synch period based upon the clock signal 114, the corresponding input video signal, and scaling information stored in the A and B timing registers 214. The horizontal synch period, a timing generator parameter, is stored in such registers 212*a*, and is used to generate the horizontal synch signal that is part of the timing control signals 108; the horizontal synch period may be altered during a frame of video. Other timing generator parameters can be similarly calculated and then stored in such registers 212*a*. In another embodiment the timing generator 212 calculates the horizontal synch period for a corresponding video input signal prior to generating the timing control signals 108 for such corresponding video input signal. In yet another embodiment, the timing generator again calculates the horizontal synch period (and/or timing generator parameters) while generating timing control signals 108 for such corresponding video input signal.

The pixel clock 222 is configured to receive the output from the selected portion of the A and B pixel clock registers 220, and generate a clock signal 114. The clock signal 114 is used to time the display of each new video pixel of the frame of the selected input video signal to be displayed on the display 112.

Figure 3:
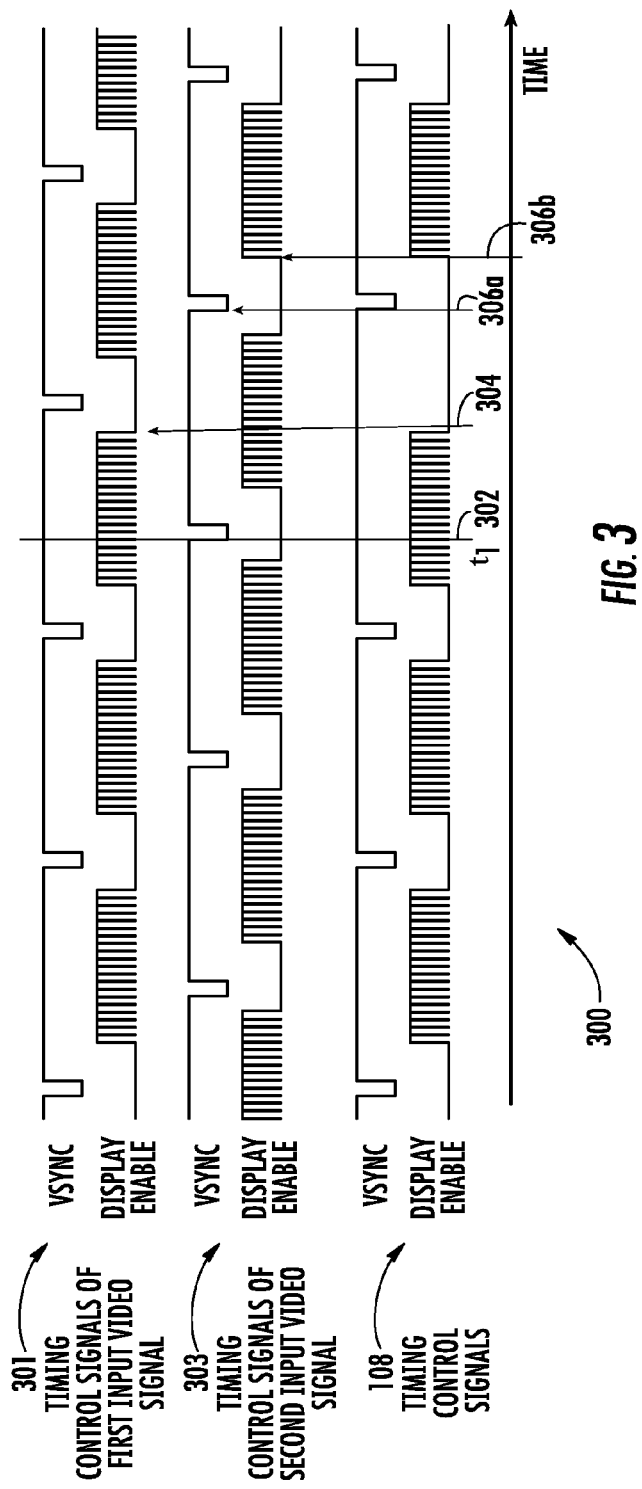
FIG. 3 illustrates an embodiment of video control signals.
Figure 4:
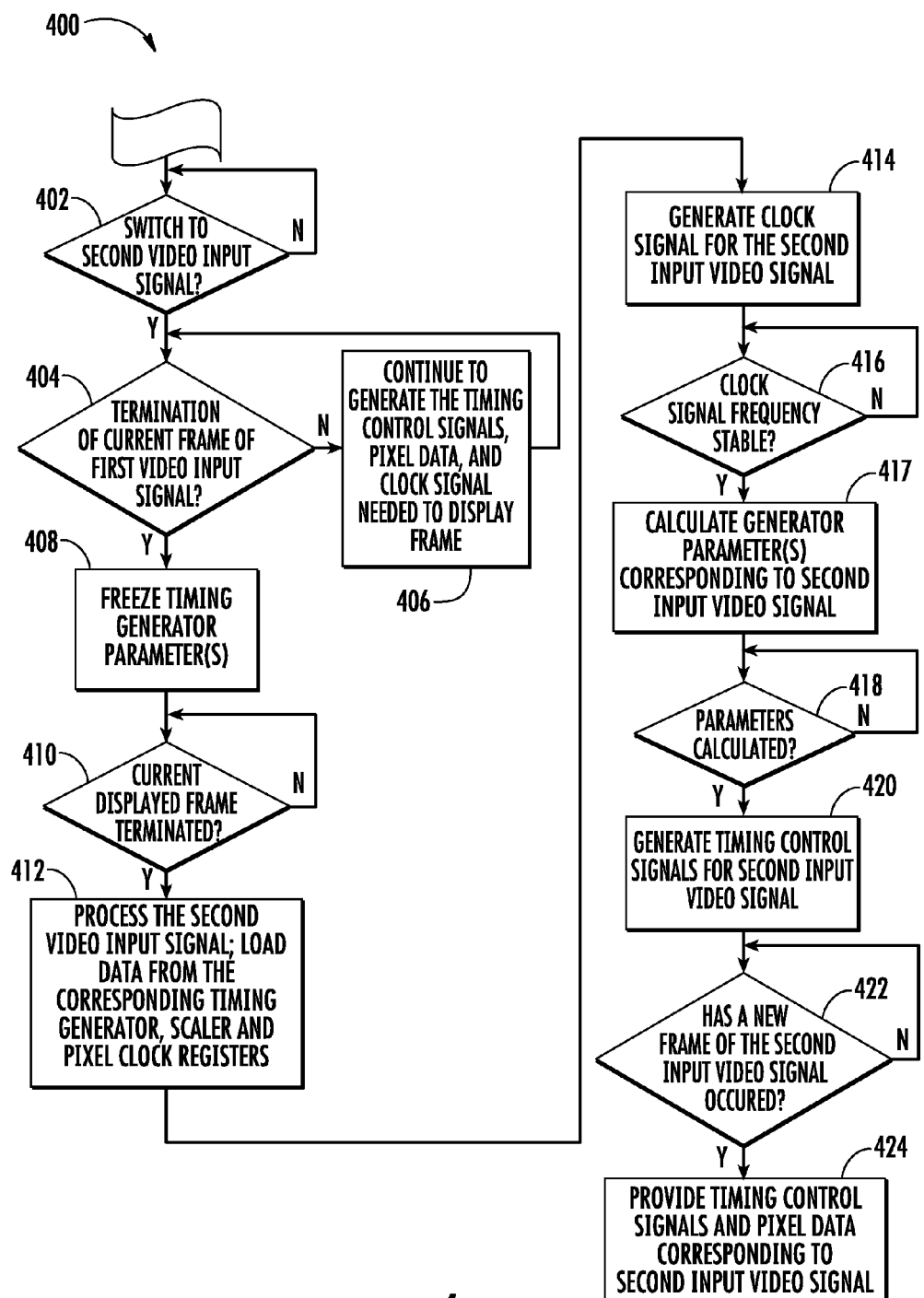
FIG. 4 illustrates an embodiment of the operation of the video processing circuit with smooth transition between video sources.

A summary of one embodiment of the operation of the video processing circuit with smooth transition between video sources 106 will now be described. The following is further illustrated in FIGS. 3 and 4. FIG. 3 illustrates video timing control signals 300, including timing control signals 301, 303, 108 respectively of the first input video signal 102*b*, of the second input video signal 104*b*, and generated by the timing generator 212 (e.g. for the video signal being displayed). FIG. 4 illustrates exemplary operation 400 of the video processing circuit with smooth transition between video sources 106.

In one embodiment, the smooth transition control circuit 204 is a state machine that operates according to the flow illustrated in FIG. 4. Alternatively, the smooth transition control circuit 204 can be implemented as a processor programmed, e.g., by firmware or other software, to operate in accordance with the flow illustrated in FIG. 4.

In block 402, determine if there is a command to switch from a first input video signal 102*b* to a second input video signal 104*b*. In one embodiment, at time t1 302, the second input video signal 104*b* is selected. If not, continue to perform block 402. If there is such a command, then in block 404 determine if the end of the current frame of the first input video signal 102*b* has been reached, i.e. if the current frame of the first input video signal 102*b* has terminated. In one embodiment, the occurrence of an end of frame timing signal for the first input video signal 102*b* is indicated by blanking of the display enable signal 304 (e.g. an indication that here is no further pixel data to be to be provided to the display for the frame) of the first input video signal 102*b*. If not, in block 406 continue to generate timing control signals 108, pixel data 110, and clock signal 114 corresponding to, and needed to display, the current frame of the first input video signal 102*b*.

If the end of the current frame of the first video input signal 102*b* has been reached, then in block 408 freeze the timing generator parameter(s), e.g. the horizontal synch period, corresponding to the first video input signal.

Then, in block 410, determine if the current displayed frame has ended or terminated, e.g. by monitoring whether an end of frame timing signal 224 has occurred for the frame of the video provided to the display 112. If no, then repeat block 410. If yes, then in block 412 process the second input video signal 104b, and load data (corresponding to the second input video signal 104b) from the timing generator, scaler and pixel clock A and B registers 214, 218, 220 respectively into the timing generator 212, scaler 216 and pixel clock 222. In one embodiment, processing means providing the second input video signal 104b to the line buffer 208 and timing generator 212 by respectively switching the selected inputs of the first and second multiplexors 206, 210. In another embodiment, block 410, also entails continuing to generating timing control signals 108, e.g. for the first input video signal 102b.

In block 414, generate the clock signal 114 for the second input video signal 104b. In block 416, determine if the frequency of this clock signal 114 is stable. The clock signal 114 must be stable to permit accurate calculation of timing control signals 108 and the proper display of the pixel data 110 for the second input video signal 104b. If the clock signal 114 is not stable, repeat block 416. If the frequency of the clock signal 114 is stable, then in block 417, calculate new timing generator parameter(s) corresponding to the second input video signal 104b. Next, in block 418, determine if such timing generator parameter(s) have been calculated. If not, repeat block 418. If yes, then in block 420 generate timing control signals 108 for the second input video signal 104b. Next, in block 422, determine if a new frame of the second input video signal 104b has begun, e.g., a vertical synch signal for the second input video signal 104b has occurred 306a or the occurred display enable signal of the second input video signal 104b is no longer blanked 306b. If no, then repeat block 422. If yes, then in block 424, provide timing control signals, including display enable or horizontal synch signals, and pixel data for the video to be displayed corresponding to the second input video signal 104b. In one embodiment, the clock signal 114 for second input video signal 104b would be provided also, if it had not already been provided earlier such as in blocks 416, 417, 418, 420, or 422. Such provision, e.g., would be to the display 112.

It will be evident to one of ordinary skill in the art that the processes and resulting apparatus previously described can be modified to form various apparatuses having different circuit implementations and methods of operation. Notwithstanding that the numerical ranges and parameters setting forth the broad scope of the present teachings are approximations, the numerical values set forth in the specific examples are reported as precisely as possible. Signal levels and generators herein are exemplified with reference to voltage or current. However, those skilled in the art understand that a voltage signal or a voltage generator can respectively be implemented with current signals and current generators, or vice versa. Therefore, such signals may also be referred herein as signals or thresholds rather than voltages and current. Correspondingly, voltage and current generators may be referred to as generators.

Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all subranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material.

The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the methods and structures disclosed herein. It is intended that the specification and examples be considered as exemplary only, with a true scope and spirit of the present teachings being indicated by the following claims.

EXAMPLE EMBODIMENTS

Example 1 includes an apparatus, comprising: at least two input video signals; a frame format detection circuit configured to receive the at least two input video signals; a smooth transition control circuit coupled to the frame format detection circuit and a video selector input, and configured to receive an end of frame timing signal; at least one multiplexor coupled to the smooth transition control circuit, and configured to receive the at least two input video signals; timing registers coupled to the smooth transition control circuit; scaler registers coupled to the smooth transition control circuit; clock registers coupled to the smooth transition control circuit; a timing generator coupled to the at least one multiplexor and the timing registers, and configured to generate timing control signals and the end of frame timing signal; a scaler coupled to the scaler registers, and configured to generate pixel data; a pixel clock coupled to the pixel clock registers, and configured to generate a clock signal; and wherein each of the timing registers, scaler registers, and pixel clock registers is coupled to the smooth transition control circuit.

Example 2 includes the apparatus of Example 1, wherein the frame format detection circuit is configured to detect characteristics of the timing control signals, a number of pixels per frame, and the clock signal of frames of at least one of the at least two input video signals.

Example 3 includes the apparatus of Example 2, wherein the frame format detection circuit is configured to provide one or more of the characteristics to a processor.

Example 4 includes the apparatus of Example 1, wherein the smooth transition control circuit is a state machine.

Example 5 includes the apparatus of Example 1, wherein the at least one multiplexor coupled to the smooth transition control circuit, and configured to receive the at least two input video signals comprises: a first multiplexor coupled between the smooth transition control circuit and the scaler; and a second multiplexor coupled between the smooth transition control circuit and the timing generator.

Example 6 includes the apparatus of Example 1 further comprising a line buffer coupled between the at least one multiplexor and the scaler.

Example 7 includes a system, comprising: a video processing circuit, comprising: at least two input video signals; a frame format detection circuit configured to receive the at least two input video signals; a smooth transition control circuit coupled to the frame format detection circuit and a video selector input, and configured to receive an end of frame timing signal; at least one multiplexor coupled to the smooth transition control circuit, and configured to receive the at least two input video signals; timing registers coupled to the smooth transition control circuit; scaler registers coupled to the smooth transition control circuit; clock registers coupled to the smooth transition control circuit; a timing generator coupled to the at least one multiplexor and the timing registers, and configured to generate timing control signals and the end of frame timing signal; a scaler coupled to the scaler registers, and configured to generate pixel data; a pixel clock coupled to the pixel clock registers, and configured to generate a clock signal; and wherein each of the timing registers, scaler registers, and pixel clock registers is coupled to the smooth transition control circuit; at least two video sources configured to generate the at least two input video signals; and a display coupled to the video processing circuit.

Example 8 includes the system of Example 7, wherein the frame format detection circuit is configured to detect characteristics of the timing control signals, a number of pixels per frame, and the clock signal, of frames of at least one of the at least two input video signals.

Example 9 includes the system of Example 7, further comprising a processor coupled to the video processing circuit.

Example 10 includes the system of Example 9, wherein the processor is configured to receive characteristics of the timing control signals, a number of pixels per frame, and the clock signal, of frames of at least one of the at least two input video signals.

Example 11 includes the system of Example 10, wherein the processor is configured to provide the video processing circuit with a video selector control signal.

Example 12 includes the system of Example 10, wherein the processor is configured to provide parameter data to be stored in the timing registers, scaler registers, and pixel clock registers.

Example 13 includes the system of Example 7, wherein the smooth transition control circuit is a state machine.

Example 14 includes the system of Example 7, wherein the at least one multiplexor coupled to the smooth transition control circuit, and configured to receive the at least two input video signals comprises: a first multiplexor coupled between the smooth transition control circuit and the scaler; and a second multiplexor coupled between the smooth transition control circuit and the timing generator.

Example 15 includes the system of Example 7 further comprising a line buffer coupled between the at least one multiplexor and the scaler.

Example 16 includes the system of Example 7, wherein the display is configured to receive the timing control signals, the pixel data and the clock signal.

Example 17 includes a method, comprising: determining whether to switch from a first input video signal to a second input video signal; upon switching from a first input video signal to a second input video signal, determining whether the current displayed frame has terminated; if the current displayed frame has terminated, process the second video input signal and load data corresponding to the second video input signal from the timing generator, scale and pixel clock registers correspondingly into the timing generator, scaler and pixel clock; generate a clock signal for the second input video signal; determine if the clock signal for the second input video signal has a stable frequency; if the frequency is stable, then calculate generator parameter(s) corresponding to the second input video signal; generate timing control signals for the second input video signal; determine if a new frame of the second input video signal has occurred; and if the new frame has occurred, then provide timing control signals and pixel data for the video to be displayed and corresponding the second input video signal.

Example 18 includes the method of Example 17, further comprising determining if the generator parameter(s) are calculated prior to generating timing control signals for the second input video signal.

Example 19 includes the method of claim 17, wherein providing timing control signals and pixel data for the video to be displayed corresponding to the second input video signal further compromises providing timing control signals, pixel data, and a clock signal for the video to be displayed corresponding to the second input video signal.

Example 20 includes the method of claim 17 further comprising: determining if the current frame of the first video input signal has terminated; and if the current frame of the first video input signal has terminated, freeze timing generator parameter(s) for the first input video signal.

What is claimed is:
1. An apparatus, comprising:
inputs for respectively receiving at least two input video signals;
a frame format detection circuit configured to receive the at least two input video signals from the inputs;
a smooth transition control circuit coupled to the frame format detection circuit and a video selector input, and configured to receive an end of frame timing signal;
at least one multiplexor coupled to the smooth transition control circuit, and configured to receive the at least two input video signals from the inputs and to select one of the at least two input video signals for further processing and display in response to a control signal from the smooth transition control circuit;
timing registers coupled to the smooth transition control circuit;

scaler registers coupled to the smooth transition control circuit;

clock registers coupled to the smooth transition control circuit;

a timing generator coupled to the at least one multiplexor and the timing registers, and configured to generate timing control signals for controlling the display of the selected one of the two input video signals and the end of frame timing signal;

a scaler coupled to the scaler registers, and configured to generate pixel data;

a pixel clock coupled to the pixel clock registers, and configured to generate a clock signal; and wherein each of the timing registers, scaler registers, and pixel clock registers is coupled to the smooth transition control circuit, and wherein the smooth transition control circuit is configured to generate the control signal and load contents of the timing registers, scaler registers and pixel clock registers causing a switching of display between a first one of the at least two input video signals to a second one of the at least two input video signals in response to the end of frame timing signal associated with the first one of the at least two input video signals and a video selector control signal.

2. The apparatus of claim 1, wherein the frame format detection circuit is configured to detect characteristics of the timing control signals, a number of pixels per frame, and the clock signal of frames of at least one of the at least two input video signals.

3. The apparatus of claim 2, wherein the frame format detection circuit is configured to provide one or more of the characteristics to a processor.

4. The apparatus of claim 1, wherein the smooth transition control circuit is a state machine.

5. The apparatus of claim 1, wherein the at least one multiplexor coupled to the smooth transition control circuit, and configured to receive the at least two input video signals comprises:

a first multiplexor coupled between the smooth transition control circuit and the scaler; and a second multiplexor coupled between the smooth transition control circuit and the timing generator.

6. The apparatus of claim 1 further comprising a line buffer coupled between the at least one multiplexor and the scaler.

7. A system, comprising:
a video processing circuit, comprising:
inputs for respectively receiving at least two input video signals;
a frame format detection circuit configured to receive the at least two input video signals from the inputs;
a smooth transition control circuit coupled to the frame format detection circuit and a video selector input, and configured to receive an end of frame timing signal;
at least one multiplexor coupled to the smooth transition control circuit, and configured to receive the at least two input video signals from the inputs and to select one of the at least two input video signals for further processing and display in response to a control signal from the smooth transition control circuit;
timing registers coupled to the smooth transition control circuit;
scaler registers coupled to the smooth transition control circuit;
clock registers coupled to the smooth transition control circuit;
a timing generator coupled to the at least one multiplexor and the timing registers, and configured to generate timing control signals for controlling the display of the selected one of the two input video signals and the end of frame timing signal;
a scaler coupled to the scaler registers, and configured to generate pixel data;
a pixel clock coupled to the pixel clock registers, and configured to generate a clock signal; and
wherein each of the timing registers, scaler registers, and pixel clock registers is coupled to the smooth transition control circuit, and wherein the smooth transition control circuit is configured to generate the control signal and load contents of the timing registers, scaler registers and pixel clock registers for causing a switching of display between a first one of the at least two input video signals to a second one of the at least two input video signals in response to the end of frame timing signal associated with the first one of the at least two input video signals and a video selector control signal;
at least two video sources configured to generate the at least two input video signals; and
a display coupled to the video processing circuit.

8. The system of claim 7, wherein the frame format detection circuit is configured to detect characteristics of the timing control signals, a number of pixels per frame, and the clock signal, of frames of at least one of the at least two input video signals.

9. The system of claim 7, further comprising a processor coupled to the video processing circuit.

10. The system of claim 9, wherein the processor is configured to receive characteristics of the timing control signals, a number of pixels per frame, and the clock signal, of frames of at least one of the at least two input video signals.

11. The system of claim 10, wherein the processor is configured to provide the video processing circuit with a video selector control signal.

12. The system of claim 10, wherein the processor is configured to provide parameter data to be stored in the timing registers, scaler registers, and pixel clock registers.

13. The system of claim 7, wherein the smooth transition control circuit is a state machine.

14. The system of claim 7, wherein the at least one multiplexor coupled to the smooth transition control circuit, and configured to receive the at least two input video signals comprises:

a first multiplexor coupled between the smooth transition control circuit and the scaler; and a second multiplexor coupled between the smooth transition control circuit and the timing generator.

15. The system of claim 7 further comprising a line buffer coupled between the at least one multiplexor and the scaler.

16. The system of claim 7, wherein the display is configured to receive the timing control signals, the pixel data and the clock signal.

17. A method, comprising:
determining whether to switch from a first input video signal to a second input video signal;
upon switching from a first input video signal to a second input video signal, determining whether the current displayed frame has terminated;
if the current displayed frame has terminated, process the second video input signal and load data corresponding to the second video input signal from the timing generator, scale and pixel clock registers correspondingly into the timing generator, scaler and pixel clock;

generate a clock signal for the second input video signal;

determine if the clock signal for the second input video signal has a stable frequency;

if the frequency is stable, then calculate generator parameter(s) corresponding to the second input video signal;

generate timing control signals for the second input video signal;

determine if a new frame of the second input video signal has occurred; and if the new frame has occurred, then provide timing control signals and pixel data for the video to be displayed and corresponding the second input video signal.

18. The method of claim 17, further comprising determining if the generator parameter(s) are calculated prior to generating timing control signals for the second input video signal.

19. The method of claim 17, wherein providing timing control signals and pixel data for the video to be displayed corresponding to the second input video signal further compromises providing timing control signals, pixel data, and a clock signal for the video to be displayed corresponding to the second input video signal.

20. The method of claim 17 further comprising:
determining if the current frame of the first video input signal has terminated; and
if the current frame of the first video input signal has terminated, freeze timing generator parameter(s) for the first input video signal.

* * * * *